Figure 1:
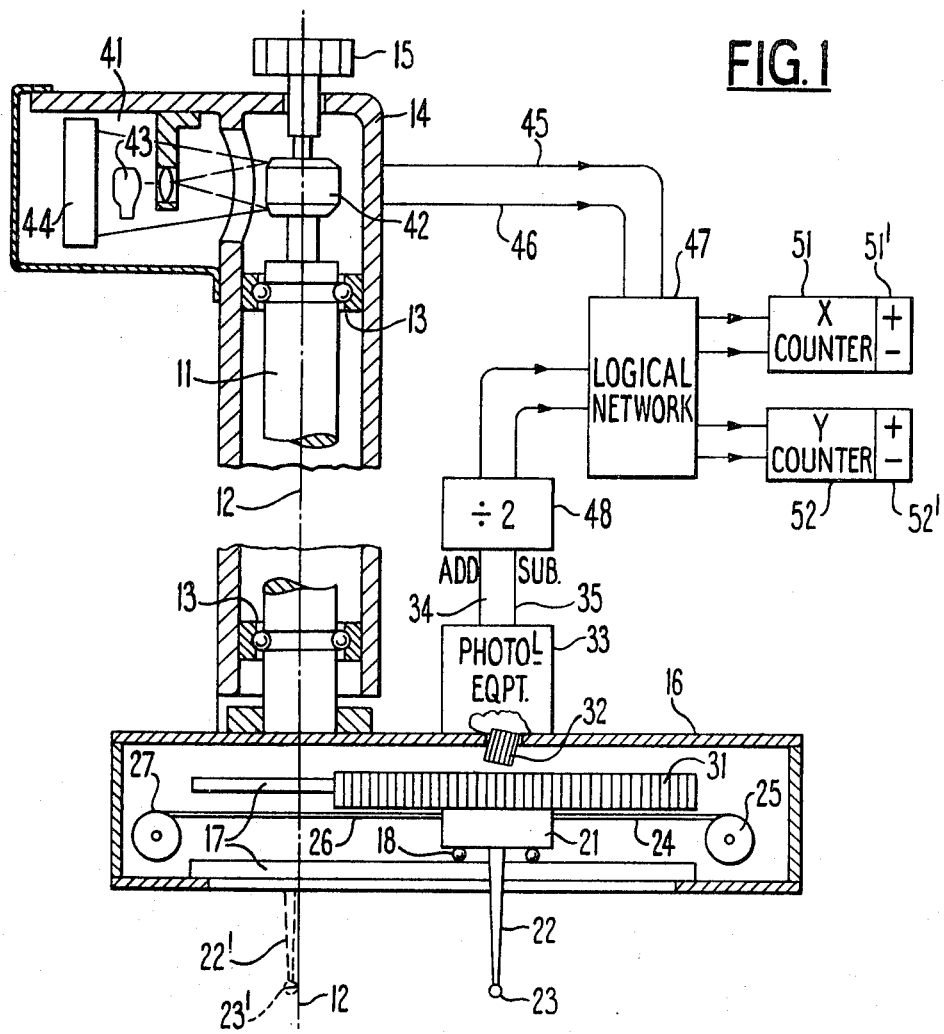

United States Patent

Ogden et al.

[15] 3,639,766
[45] Feb. 1, 1972

[54] ELECTRICAL-OPTICAL COORDINATE INSPECTION MACHINES

[72] Inventors: Harry Ogden; Neil Rutherford Laidlaw, both of Edinburgh, Scotland; William Clarke Bradford, Islington, Ontario, Canada

[73] Assignee: Ferranti Limited, Hollinwood, England

[22] Filed: Nov. 25, 1968

[21] Appl. No.: 778,570

[52] U.S. Cl. ........................250/202, 250/231, 250/237
[51] Int. Cl. ..................G01d 5/38, G05b 1/06, H01i 3/14
[58] Field of Search ..................250/202, 230, 231, 237

[56] References Cited

UNITED STATES PATENTS 2,851,643  9/1958  Limberger .................250/202 X
3,555,590  11/1967  Bertram ......................250/231 X
3,394,248  7/1968  Ogden .........................250/237 X Primary Examiner—Robert Segal
Assistant Examiner—C. R. Campbell
Attorney—Cameron, Kerkam and Sutton

[57] ABSTRACT

A probe structure for an inspection machine to check the location of workpiece holes includes a probe shaft having a radial arm traversed by a carriage from which the probe proper extends parallel to the shaft axis at distances measured by a pulse count. The carriage is spring urged outwardly to maintain the probe in engagement with the hole surface throughout a manual rotation of the shaft. An optical-electric transducer defines X- and Y-coordinates with the shaft axis as origin and switches the pulses to X- and Y-counters so as to cause their readings to define the coordinates of the hole center at the end of such rotation.

7 Claims, 10 Drawing Figures

[3,639,766]

ELECTRICAL-OPTICAL COORDINATE INSPECTION MACHINES

This invention relates to probe structures for coordinate inspection machines of the kind for making measurements on a workpiece with respect to a rectangular system of X- and Y-coordinates. In such a machine the probe may be dependent from a carriage which is movable in the X- or Y-direction along a gantry above the workpiece, the movement along the other coordinate axis being effected by moving either the gantry or the workpiece. Alternatively, both gantry and carriage may be fixed and the movements in both the X- and the Y-directions effected by moving the workpiece. Whatever the arrangement, the relative movements along each axis are conveniently measured by electrical pulses derived from a transducer, which may be of the kind that responds to the corresponding movements of patterns formed by optical gratings.

A difficulty arises when it is desired to use such a machine for checking the position on a workpiece of a cylindrical hole drilled in it, since the point whose coordinates need to be ascertained is the center of the hole, and as such a point has no material existence it is not directly gaugeable. Where the relative movements are not appreciably restricted by friction or inertia, it is known to use for this purpose a probe with a conical tip. After the probe has been positioned so that its axis is defined by the desired coordinates of the hole whose position is to be checked, the probe tip is lowered into the hole, conical apex first, thereby bringing about such X- and Y-workpiece movements as may be necessary to align the hole axis with that of the probe; the extents of such movements indicate the error in the hole position. A disadvantage of such an arrangement is that it can only be used where friction and inertia are very slight, otherwise the insertion of the probe tip in an incorrectly located hole might bend the probe rather than effect the corrective movement.

A difficulty also occurs when the point to be measured is the center of a cylindrical stub formed on a workpiece, for though the point exists it is not usually identifiable.

An object of the present invention as to provide for a coordinate inspection machine a new and useful probe structure.

A particular object is to provide such a structure which allows the coordinates of the center of a workpiece hole or stub to be quickly and easily determined.

In accordance with the present invention, a probe structure for a coordinate inspection machine includes a. a shaft rotatable about its axis and carrying a radial arm, b. a probe extending generally parallel to that axis from a supporting carriage arranged to traverse the arm from a datum position of the probe, c. linear transducer means for measuring by a pulse count the extent and sense of the probe movement along the arm with respect to the datum position, d. control means for defining a system of rectangular X- and Y-coordinate in a plane normal to said axis with the axis as origin and for deriving with respect to that system i. axis-engagement signals accurately responsive each time the probe comes into engagement with a said coordinate axis during a rotation of the shaft, and ii. axis-identifying signals for severally representing the identity and sign of each coordinate axis thus engaged by the probe, e. bidirectional counters allocated to the X- and to the Y-coordinate axes of said system, and f. a logical network, controlled by said signals (i) and (ii) as the probe traces out a circle whilst the shaft rotates, for applying the transducer pulses to the X-counters and to the Y-counters throughout arcs of said circle having as the chords the X- and the Y-coordinate axes respectively, whereby at the conclusion of a complete rotation of the shaft the counters define by the number and sign of their contents the respective coordinates of the center of said circle with respect to said coordinate system.

Figure 2:
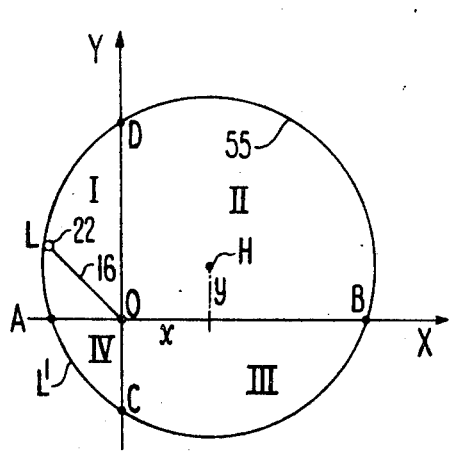
Figure 3:
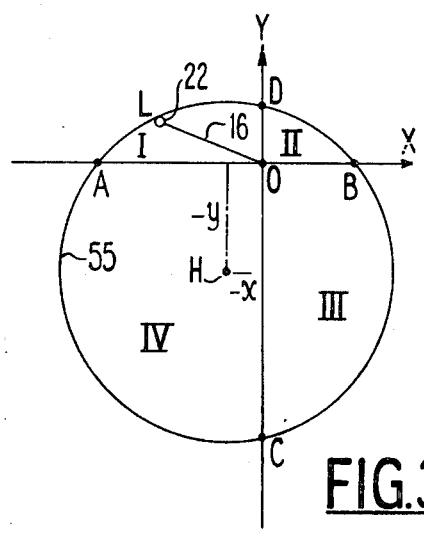
Figure 4:
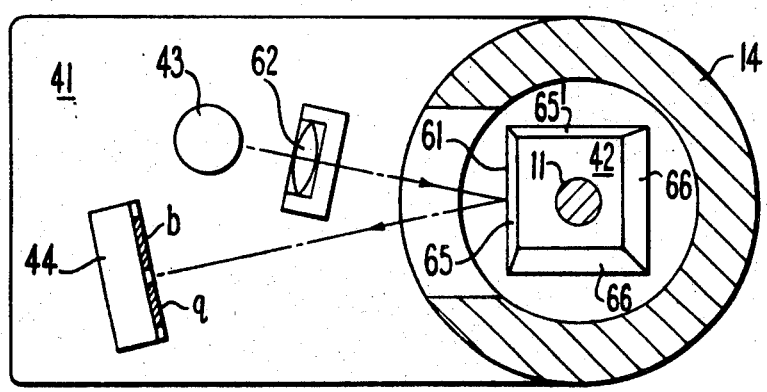
Figure 5:
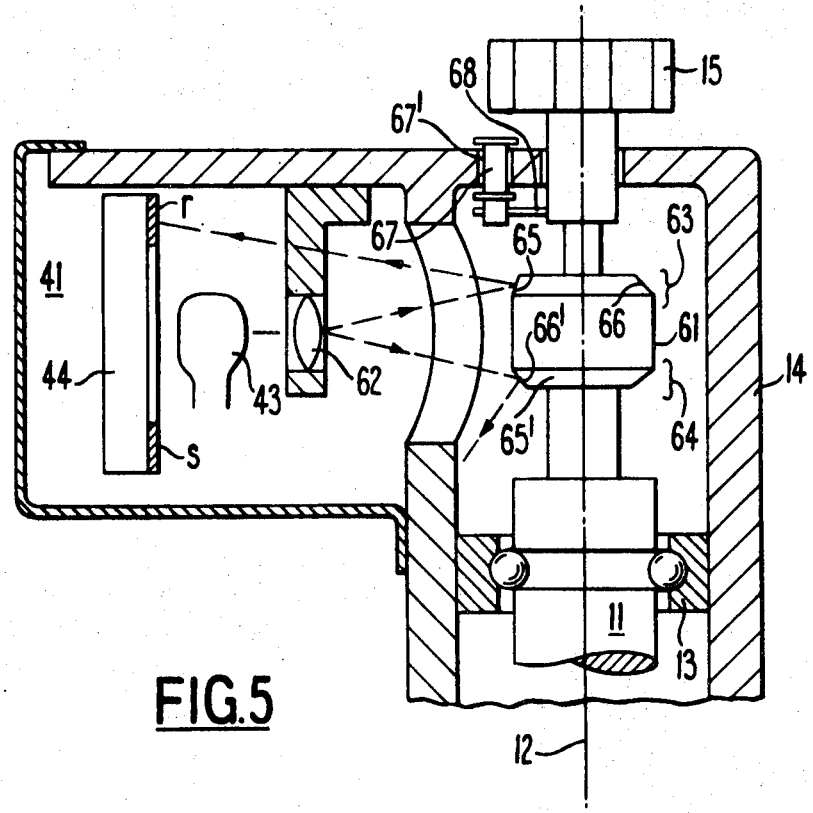
Figure 6:
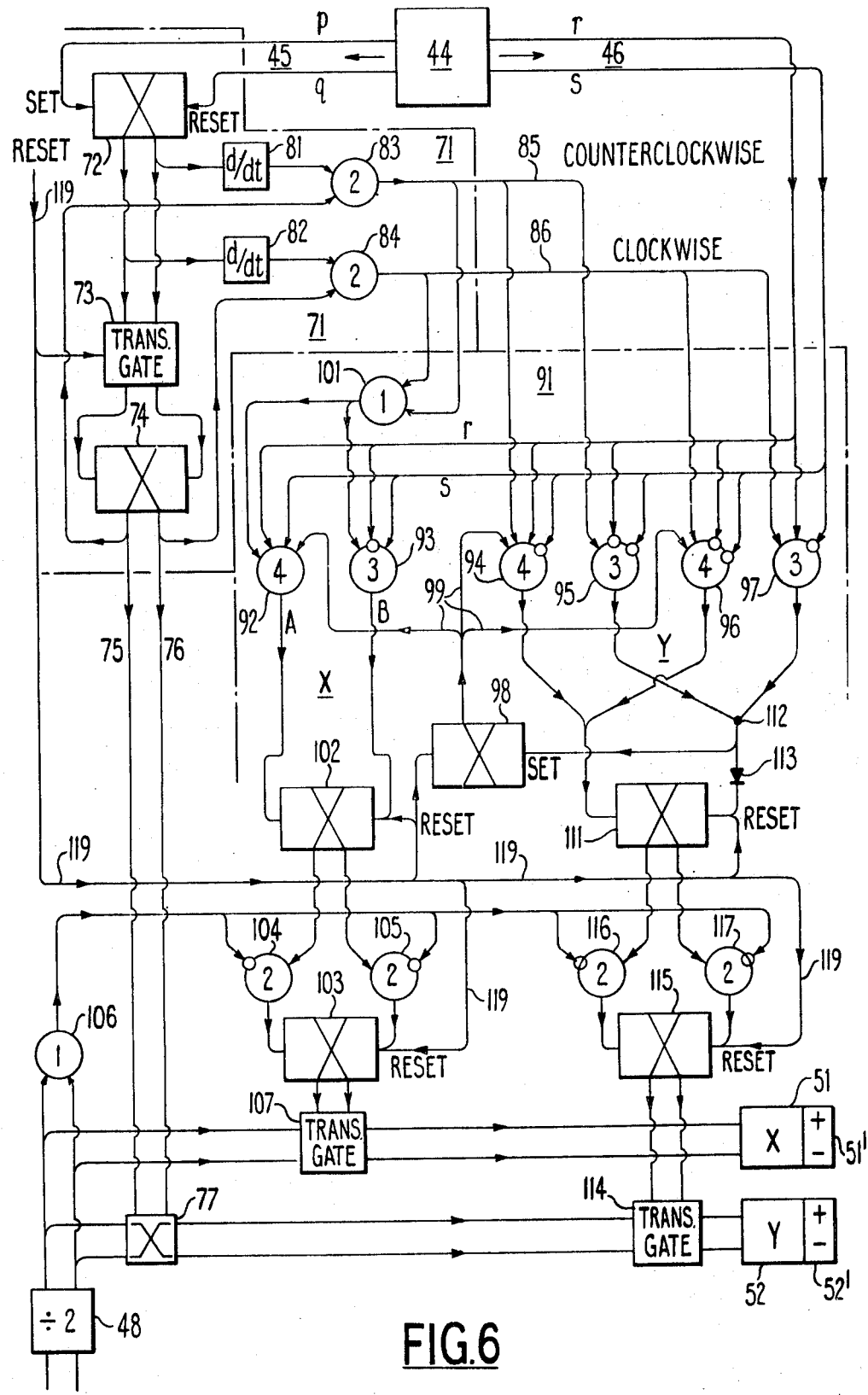
Figure 7:
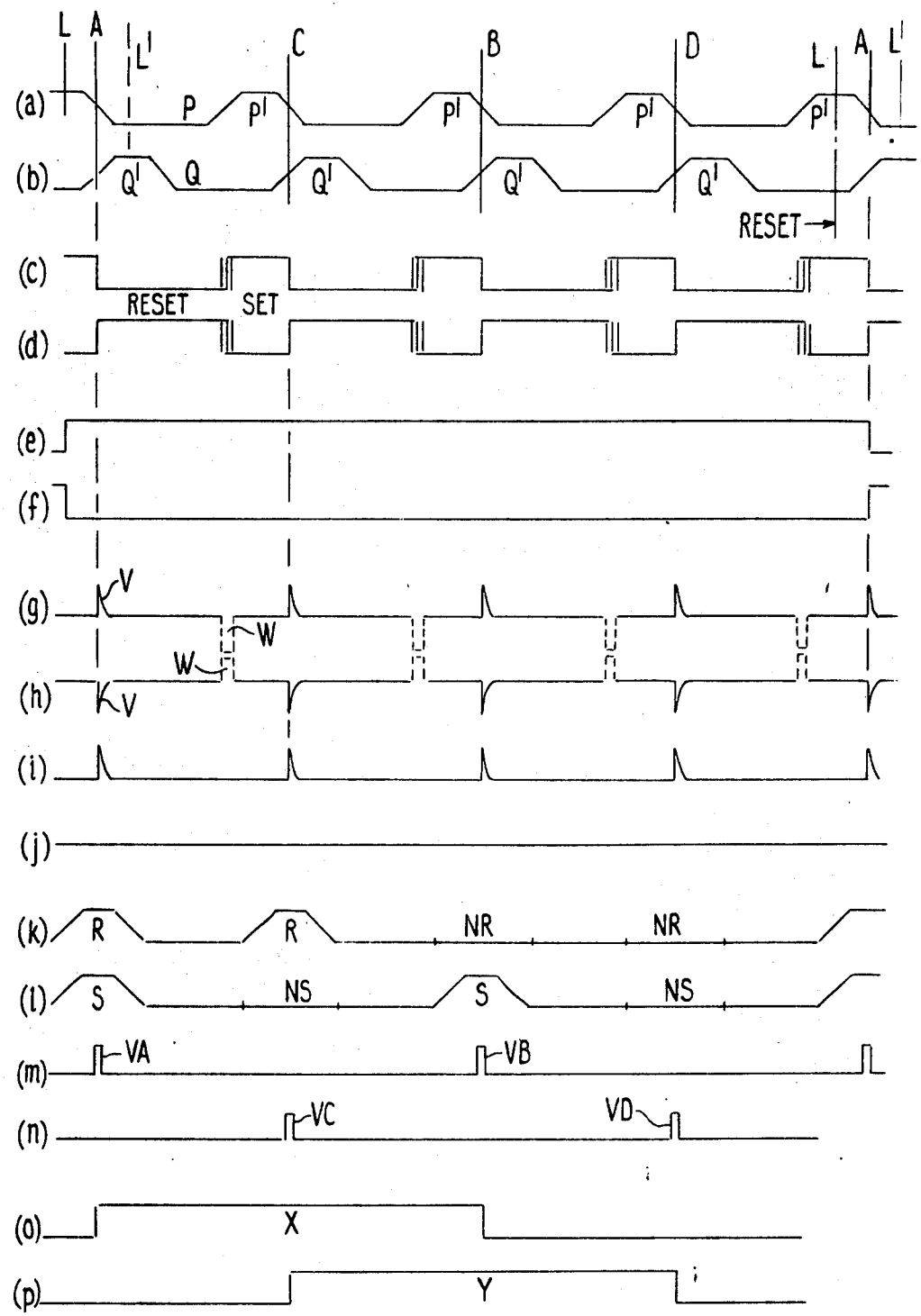
Figure 8:
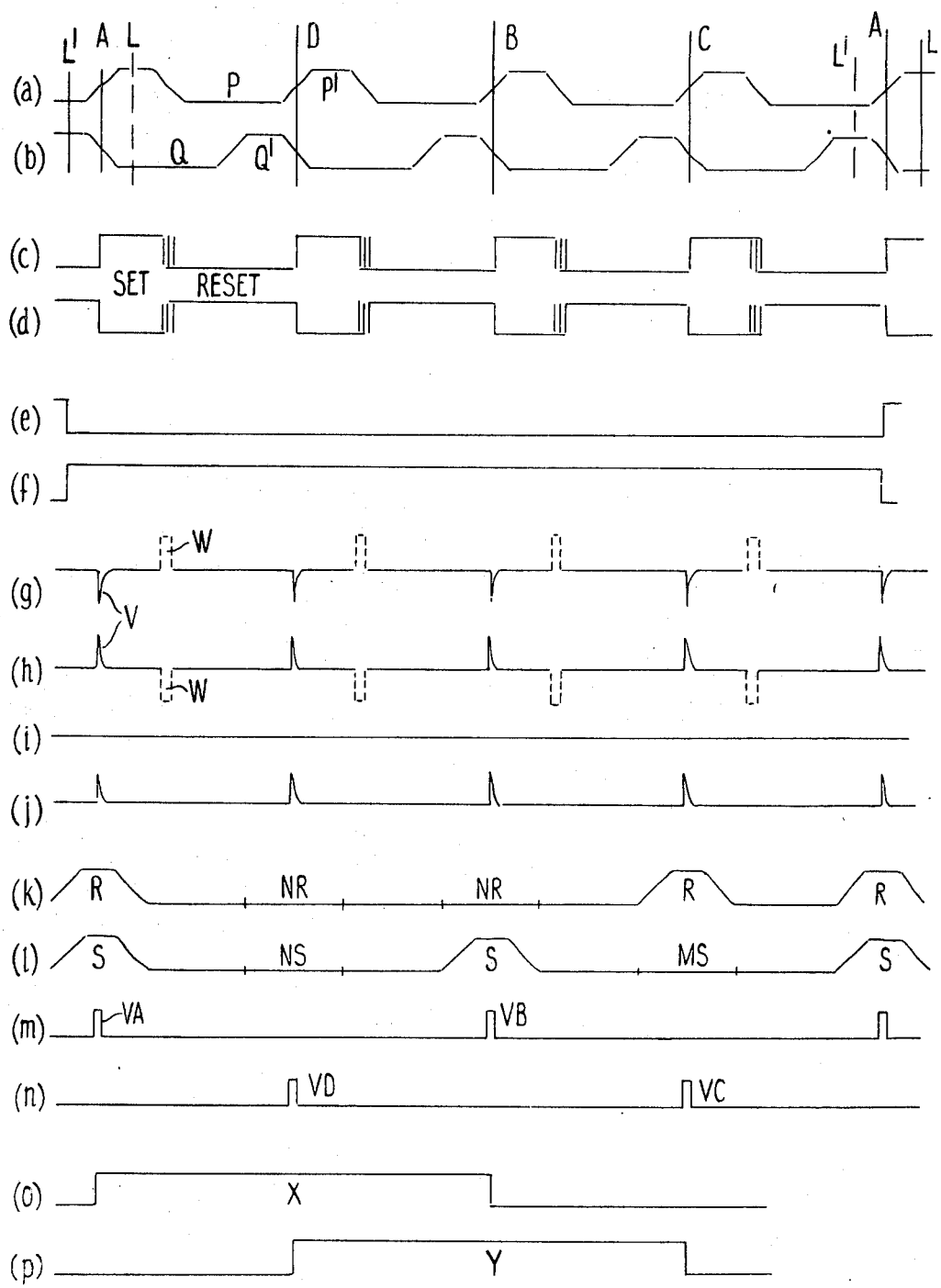
Figure 9:
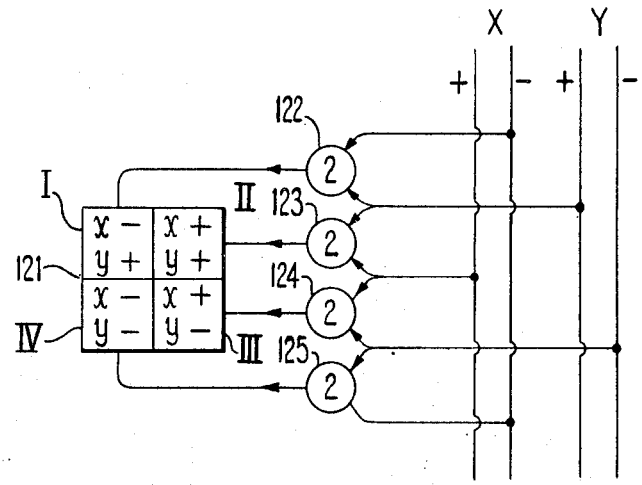
Figure 10:
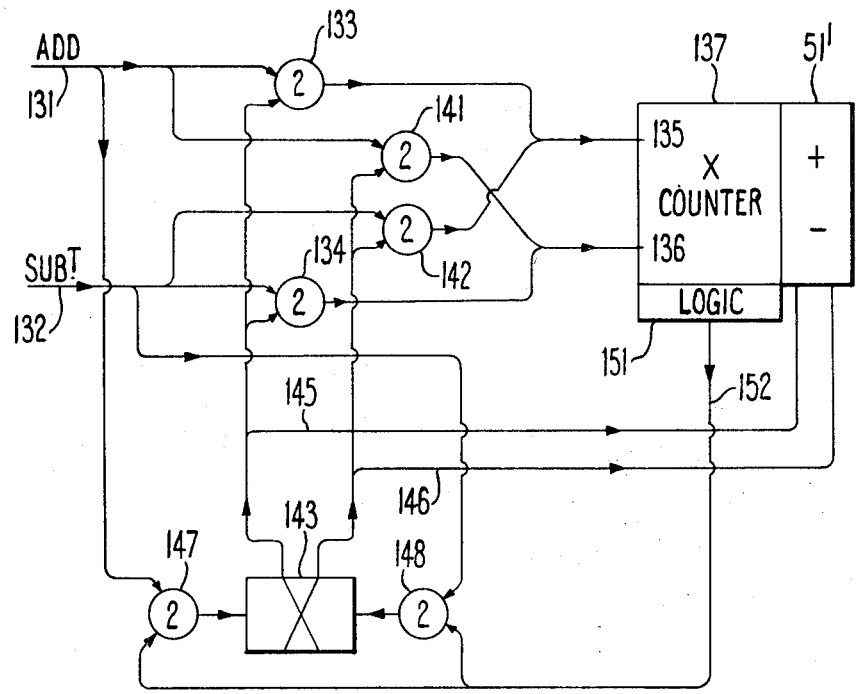

In the accompanying drawings,

FIG. 1 is a simplified and partly schematic diagram of one embodiment of the invention, FIGS. 2 and 3 are diagrams to illustrate the operation of the embodiment of FIG. 1, FIG. 4 is a section in plan of a part of the arrangement of FIG. 1, FIG. 5 is a section in elevation of the part shown in FIG. 4, FIG. 6 is a schematic circuit diagram of a part shown in block form in FIG. 1, FIGS. 7 and 8 show signal waveforms to illustrate the operation of the arrangement of FIG. 6, FIG. 9 is a schematic circuit diagram of auxiliary equipment for use with the arrangement of FIG. 6, and FIG. 10 is a schematic circuit diagram of a counter stage shown in block form in FIG. 6.

In carrying out the invention in accordance with one form by way of example, see FIG. 1, a probe structure for a coordinate inspection machine includes a vertical shaft 11 journaled for rotation about the shaft axis 12 in bearings 13 from a frame structure 14 arranged to support the shaft (by means of bearings 13, which therefore act also as thrust bearings) above a workpiece (not shown). Frame 14 is itself mounted on the traversing carriage of a movable gantry which enables the shaft to be moved with respect to a main system of horizontal rectangular coordinates. The main system is fixed with respect to the workpiece to be measured; this allows the shaft axis 12 to be accurately adjusted along the X- and Y-coordinates of the system into alignment with a particular point on the workpiece. As the carriage and gantry may be of a conventional kind, they and the main system of coordinates are omitted so as to clarify the drawing.

At its upper end, shaft 11 is manually rotated about its axis 12 by a knob 15. To the lower end of the shaft is secured a radial arm 16 having guideways 17 along which on bearings 18 a probe carriage 21 can travel in a radial direction—that is, towards or away from axis 12 of the shaft. Dependent from the carriage is the probe itself 22 extending parallel to axis 12 and ending in a spherical tip 23. The carriage can move the probe to a datum position (indicated by the broken lines at 22¹) in which the actual gauging surface 23¹ of the tip—that is, the surface that is to be brought into contact with the worpiece—is aligned with the axis 12 of the shaft.

The carriage 21 is urged outwardly from axis 12 by a tension spring 24 running into a drum 25 at the free end of arm 16. To retard and generally stabilize the resulting outward motion, a second and weaker spring 26, issuing from a drum 27 located at the other end of the arm, acts on the carriage in the other direction. The carriage movement control also includes a governor to regulate the velocity, together with arrangements for winding up spring 26 in drum 27 and for locking the probe in the datum position. As simple mechanisms for these purposes may be readily devised, they are not shown and need no description.

To measure by a pulse count the extent and direction of a movement of the probe carriage along the radial arm, a linear transducer is provided. This includes an optical grating 31 attached to the carriage to move with it past an index grating 32 attached to the arm. Grating 32 is slightly skew relative to grating 31 so that the two between them setup in known manner an optical pattern which moves relative to the arm as the carriage moves along the arm. For clarity, the gratings are depicted as separate, though in practice they are closely parallel to one another.

Photocell-driven circuitry, indicated generally by the block 33, is arranged to respond to the movement of the pattern so as to supply by way of an Add output lead 34 or a Subtract output lead 35 a pulse for each constant increment of movement of the carriage 21 along radial arm 16 away from axis 12 or towards it, respectively. The pulses thus supplied by the grating system will be designated the grating pulses to distinguish them from other pulses derived for switching purposes as described later.

Near the upper end of shaft 11, means for defining a system of rectangular X- and Y-coordinate in a plane normal to axis 12 and having that axis at the origin O—see FIG. 2—includes first and second rotational transducer means combined in an optical stage 41. This system of coordinates will be referred to as the auxiliary system, to distinguish it from the conventional main system above mentioned. Reverting to FIG. 1, stages 41 includes an optical block 42 fixed to rotate with shaft 11 and arranged to reflect light from a lamp 43 to an array 44 of photocells.

In order to define the auxiliary coordinate system (in a manner to be explained later) stage 41 serves to derive with respect to that system, as arm 16 rotates about the origin 0 of the system, two groups of coded signals: (1) axis-engagement signals derived by a first rotational transducer so as accurately to respond each time the probe comes into engagement with one of the coordinate axes, and (2) axis-identifying signals derived by a second rotational transducer so as severally to represent the identity and sign of each coordinate axis thus engaged by the probe.

These signals are generated by array 44 and applied over channels 45 and 46, respectively, to control a logical network 47 by means of which the Add and Subtract pulses from photocell stage 33, after being halved in number by a stage 48, are applied to bidirectional counters 51 and 52 allocated to the X- and to the Y-coordinates of the auxiliary system. Network 47 includes arrangements to ensure that Subtract pulses received after a counter has passed through zero (as described later) are added by the counter, and that the sign of the number held by a counter is indicated in a supplementary stage $51^1$ or $52^1$ as the case may be.

Details of stage 41 and network 47 may more readily be understood if a brief indication is first given of how the apparatus as so far broadly described may be operated, taking as an example its use in checking the location of a cylindrical hole drilled in a workpiece.

The workpiece is placed in position on the machine with the hole vertical and the gantry and its carriage adjusted to bring axis 12 into alignment with the desired location of the hole axis as defined by the coordinates of the main system. The probe 22, locked in its datum position, is lowered into the hole, leaving arm 16 above the hole and so free to rotate.

It is assumed in this example that though the hole has the correct diameter, it is not correctly located, and that its axis lies, not at the origin 0 of the auxiliary coordinate system, as it should do, but somewhere in the quadrant between the +x and +y coordinate axes.

Thus (referring to FIG. 2) the hole axis is at some point H defined by the X- and Y-coordinates +x and +y of the auxiliary system. The circle 55 represents in plan the cylindrical wall of the hole, having the point H as center. The apparatus is required to measure the coordinates of error $x$ and $y$, and indicate their respective signs.

For ease of reference let the X-axis cut circle 55 at A (negative) and B (positive), and the Y-axis cut the circle at C (negative) and D (positive). Starting with the quadrant $-x$ and $+y$ and preceding clockwise, the four quadrants are labeled I to IV.

From elementary geometry we have $$x = \tfrac{1}{2}(OB-OA)$$
$$y = \tfrac{1}{2}(OD-OC)$$

With the radial arm 16 in, say, quadrant I, at an angular position defined by a limit stop, the probe lock is released. Spring 24, curbed by spring 26 and the governor, accordingly runs the probe out along the arm until its gauging surface is arrested by contact with the wall of the hole at some point L on circle 55. After resetting the counters to zero, the operator turns knob 15 to give arm 16 a complete rotation counterclockwise, with the result that the probe tip, maintained by spring 24 in engagement with the hole wall, traverses circle 55 from the point L through points A, C, B, and D, back to L.

Network 47 is so controlled from stage 41 that as the probe tip comes into engagement with the point A and the arm 16 into alignment with the X-axis, the grating pulses from stage 33, after being halved in number by stage 48, are applied to the X-counter 51, and remain so applied throughout the time the probe is traversing the arc ACB which has the X-axis as a chord. The instant the point B is reached, the pulses are cut off from the X-counter. The algebraic total of pulses which have been supplied by stage 33 whilst this arc was being traversed represents the distance (OB–OA); hence by accepting half that number, the X-counter represents by its total the distance $x$.

Similarly, as the point C is reached and the arm comes into alignment with the Y-axis, the grating pulses from stage 33, halved in number by stage 48, are applied to the Y-counter 52, and remain applied throughout the time the probe is traversing the arc CBD which has the Y-axis as its chord. The pulses are cut off the instant the probe tip passes the point D. The total in the Y-counter thus represents the distance $y$.

As the net radial excursion of the probe is in the outward direction from axis 12 both whilst traversing the arc ACB and the arc CBD, since in each case the count begins when the probe carriage is closer to axis 12 than it is at the end of the count, the majority of the pulses delivered by stage 33 are in the Add lead 34, with the result that each of the supplementary counter stages $51^1$ and $52^1$ indicate the positive sign.

It will be seen that whilst the probe is traversing the arc CB both counters are in action; but this requirement presents no difficulty.

Thus the readings of the two counters indicate the coordinates of the point H and hence the extent and direction of the displacement of the hole axis from the desired location.

The correct application of the pulses to the X- and Y-counters is effected by optical stage 41, by the control it exercises over network 47 by means of the axis-engagement and axis-identifying signals delivered over channels 45 and 46.

The operation would be similar if the hole axis H were in one of the other quadrants—quadrant IV, say, see FIG. 3. The only difference would be that the net excursions of the probe carriage would be towards axis 12 instead of away from it. In response, stage 33 would deliver most of its output pulses over the Subtract lead 35 and the algebraic totals held in counters 51 and 52 would be correctly given negative signs by their supplementary stages.

The correct signs are also displayed if the point H should be in one of the other two quadrants I or III. In each of these cases, of course, one of the counters would exhibit a positive sign and the other a negative.

If after completing a counterclockwise scan from, say, one side of the limit stop at the point L to the other side of the stop, a return scan were made in the opposite direction, both sign indications provided by the counters would be in error; for in each case the count would begin from the point D or B which is further away from axis 12 than the corresponding finishing point C or A, and so both readings would be wrongly given as negative unless the apparatus was designed to correct them.

Though it would be possible to ensure that only the counterclockwise scans are effective, or at least to indicate that direction by, say, an arrow on knob 15, and provide a spiral spring or the like to restore arm 16 in the idle direction, such an arrangement might not be satisfactory. There would for instance be the time wastage of the idle returns, and though these might be avoided by allowing the limit stop to be overridden at will so that the arm could move from the finishing side of it to the starting side direct, such a device would be liable to accidental misoperation. Further, any hesitancy by the operator in the manipulation of knob 15 which resulted in a momentary clockwise movement immediately after crossing one of the coordinate axes might introduce a quantitative error in the reading.

The apparatus is accordingly designed to allow effective scans to be made in either direction. By making the stop movable from the point L in quadrant I to a point $L^1$ in quadrant IV, it is easy to arrange that whereas the counterclockwise scans start from L as before, with no need for sign correction, the clockwise scans start from $L^1$. As a result of starting from the point $L^1$ the X-count begins at A and ends at B just as in the counterclockwise case, and so needs no sign correction, whereas on the Y-axis the point D is reached before the point C and so correction is required.

It is the further province of stage 41 to ensure correctness of sign, in particular by causing a reversal of the pulse feed to the Y-counter during a clockwise scan, and this it does by the control it exercises over network 47 by means of the axis-identifying signals delivered over channel 46. A more detailed description of stage 47 will now be given with reference to FIGS. 4 and 5.

FIG. 4 shows in much simplified structural form the first rotational transducer for generating the axis-engagement signals. Optical block 42 resembles a mirror cube of polished steel, possibly stainless steel, fixed to shaft 11. The upper and lower horizontal edges are bevelled to form part of the second rotational transducer for deriving the axis-identifying signals as described in the next paragraphs.

For the first transducer only the vertical reflecting surfaces 61 are used. As their height (that is, their dimension in directions parallel to axis 12) need not be equal to their widths, a strictly cubic shape for block 42 is not necessary. The essential requirement is for the block to be square in plan. Each surface in turn, as the block rotates with shaft 11, reflects the light from lamp 43, after focusing by a lens 62, towards two cells $p$ and $q$ of the photocell array 44. These two cells are mounted close to one another along the arc swept by the reflected beam as the block rotates. They accordingly provide an equal output only when the beam is aligned on the midpoint between them. As the beam moves across the midpoint, the outputs vary oppositely, increasing from one cell and decreasing from the other, in accordance with the direction of rotation, as is described below with reference to the waveforms of FIGS. 7 and 8. By such equality and opposite variation of their outputs, as applied over channel 45 to network 47, the cells identify the instant when arm 16 crosses one of the coordinate axes.

The joint response of cells $p$ and $q$ merely indicates that a coordinate axis has been engaged. It does not identify either the particular axis or its sign. Such further identification is provided by the second transducer which includes two further cells $r$ and $s$, see FIG. 5, spaced in a vertical plane, one above and one below the midpoint of cells $p$ and $q$, towards which the focused light from lamp 43 is reflected by the bevelled edges of the block.

Thus lamp 43 is common to both transducers.

There are two sets 63 and 64 of the bevelled edges, see FIG. 5, one set above and the other below the vertical reflecting surfaces 61. Each of the four edges of set 63 has one or other of two angles of slope. Thus the slope of each of the two edges 65 is such as to direct the light to cell $r$ when that particular edge becomes illuminated, whereas the slope of each edge 66 is such as to direct the light away from the cell.

Similarly in set 64, edges $65^1$ direct the light to cell $s$ but edges $66^1$ direct the light away. As depicted in FIG. 5, an edge 65 of the upper set 63 is reflecting light to cell $r$, whereas an edge $66^1$ of the lower set 64 is deflecting light away from cell $s$. One set of edges is staggered relative to the other so that each face of the cube as it becomes illuminated is identified by a two-bit binary code combination of responses of cells $r$ and $s$, as delivered to network 47 over channel 46, the responding cells being in turn, as the block rotates counterclockwise (as viewed in FIG. 4): (i) both cells; (ii) cell $r$ but not cell $s$; (iii) cell $s$ but not cell $r$; (iv) neither cell.

Thus in addition to supplying the engagement and identifying code signals, stage 41 defines the auxiliary system of coordinates, the orthogonal axes being defined by the exact squareness of block 42 in plan, the orientation of the axes by the angular position of cells $p$ and $q$, together with lamp 43 and lens 62, about axis 12 with respect to frame 14, and the signs of the coordinate axes by the axis-identifying responses of cells $r$ and $s$.

The above combinations (i) to (iv) can be used to identify any four combinations of the coordinate axes. In the present arrangement they indicate the engagement of the probe with points A, C, B, and D, respectively.

Near the top of shaft 11 is located the limit stop 67 (see FIG. 5) fixed to the frame 14 and in the path of a radial pin 68 extending from the shaft. As described later, the stop is allowed a small extent of arcuate movement with respect to axis 12 in a slot $67^1$.

Various logical networks may be adopted for stage 47. A convenient arrangement is shown in FIG. 6, in which the components that have already been referred to are given their previous references.

The axis-engagement signals in channel 45 from cells $p$ and $q$ are delivered from stage 44 in leads so labeled to a direction-responsive subnetwork 71 designed to represent the direction of rotation of the radial arm 16. The subnetwork includes a bistable stage 72 to the Set and Reset inputs of which leads $p$ and $q$ are respectively connected. The counterphase outputs from the stage are applied by way of a transmission gate 73 to the switching inputs of another bistable stage 74. The outputs from stage 74 are applied over leads 75 and 76 to control a reversing stage 77 in the leads from halver stage 48 to the Y-counter 52.

Network 71 also includes stages 81 and 82 by means of which the respective counterphase outputs from bistable stage 72 are differentiated before being respectively applied as one of the inputs to two-entry AND-gates 83 and 84, the other inputs to which are connections from leads 75 and 76 respectively. The connection to differentiator stage 81 is from that output of stage 72 which goes in the positive direction when the stage is reset. The connection to stage 82 is from the other output. The outputs from these gates are delivered over leads 85 and 86 to a switching subnetwork 91 for controlling the delivery of the grating pulses from stage 48 to the X- and Y-counters. As will be made clear from the ensuing description of the operation of this network, the output over each of leads 85 and 86 takes the form of a train of sharply defined switching pulses, one for each engagement of the probe with a coordinate axis and hence five per complete scan, which appear only in lead 85 or only in lead 86 depending on whether the direction of scan is counterclockwise or clockwise.

The most significant feature of network 91 is the array of six gates 92 to 97 of which gates 92, 94, and 96 have four entries, whereas gates 93, 95, and 97 have only three. In response to (a) the switching pulses received from network 71 over one or other of leads 85 and 86, (b) the axis-identifying signals received in channel 46 from cell $r$ and $s$ over leads so labeled, and (c) a reset control signal received from a bistable stage 98 over a lead 99 (energized only when the stage is in its Reset condition), these gates act as a logic network to set up the appropriate switching conditions. To simplify the description of this part of the network the signals received from cells $r$ and $s$ will be designated R and S, prefixed by the letter N (meaning "Not") where the signal is applied to a gate in an inhibiting sense.

Gates 92 and 93 control the application of the grating pulses to the X-counter. Each gate receives as one input a signal derived from either of leads 85 and 86 as combined by an OR-gate 101, and signal S as another. The third input to gate 92 is signal R and the third to gate 93 is signal NR. Lead 99 supplies the fourth input to gate 92. Thus so long as stage 98 is reset, these two gates conduct in response to the above code conditions (i) and (ii) respectively and so define by the switching pulses the period when the grating pulses are passed to the X-counter. The output leads from these gates are accordingly labeled A and B to indicate that the gate concerned is opened in response to the engagement of the probe with points A and B respectively of its scan (see FIG. 2).

The outputs from gates 92 and 93 are applied to the Set and Reset inputs of a bistable stage 102 the outputs of which are applied to the Set and Reset inputs of another such stage 103, in each case by way of a two-entry AND-gate 104 or 105. To each of the other two inputs of these gates are applied in an Inhibit sense the grating pulses as halved by stage 48 and combined by an OR-gate 106. As will be explained in more detail later, this duplication of bistable stages with a grating pulse control interpolated is to prevent misoperation due to a grating pulse arriving at the instant of switching the X-counter into circuit. The output from stage 103 is applied to control a transmission gate 107 in the connections leading from stage 48 to the X-counter.

The logical arrangements for controlling the application of the grating pulses to the Y-counter are rendered somewhat more complicated by the fact that whereas with the X-axis the probe reaches the points A and B in that order whichever the direction of rotation, with the Y-counter the corresponding order of points C and D does depend on the direction, the point C being reached before D in a counterclockwise scan but D before C in a clockwise scan. It is for this reason that, as already mentioned, it is necessary to reverse the grating pulse feed to the Y-counter for a clockwise scan to ensure corrections of sign, and this is effected by stage 77 under the control of stage 74. It is further necessary in a clockwise scan to begin the count at D, rather than C; for this purpose two pairs of gates are needed in place of the one pair 92 and 93 needed for the X-axis, and the appropriate pair is brought into action by a signal on lead 85 or 86 which represents the direction of scan.

To respond to a counterclockwise scan, therefore, gates 94 and 95 are provided. Each has an input from the counterclockwise lead 85. Two further inputs to gate 94 are signals R and NS, representing condition (ii), and a fourth is supplied by lead 99. The remaining two inputs to gate 95 are signals NR and NS, representing condition (iv).

For the clockwise scan, on the other hand, gate 96 has inputs from the clockwise lead 86 and lead 99, together with signals NR and NS; whilst gate 97 has signals R and NS, and an input from lead 86.

The outputs from gates 94 and 96, representing the engagement by the probe of points C (counterclockwise) and D (clockwise), and hence in each case the start of a Y-count, are connected in common to the Set input of a bistable stage 111. To the Reset input are connected the outputs from cells 95 (D, counterclockwise) and 97 (C, clockwise) by way of a common point 112 and a diode 113.

From common output point 112 is derived a signal for switching stage 98 to its Set condition.

The connections from stage 111 to a transmission gate 114 in the leads to the Y-counter exactly correspond to those from stage 102 to gate 107; thus the outputs from stage 111 are applied to another bistable stage 115 by way of AND-gates 116 and 117 controlled from OR-gate 106.

For resetting purposes, electric contacts (not shown) may be attached to the stop 67 and cooperating pin 68—see FIG. 5—so that a lead 119 is energized so long as the stop is engaged. This lead is connected to the control point of gate 73, so that the gate is open only so long as the lead is energized, and to the resetting points of each of the five bistable stages in network 91. Diode 113, appropriately poled, is included in the connection between common point 112 and the reset input to stage 111 to prevent a reset signal on lead 119 from reaching stage 98 by way of point 112 and so undesirably switching stage 98 to its Set state.

Stop 67 is in the form of a peg freely slidable in arcuate slot $67^1$, which is centered on axis 2 between end positions representing the points L and $L^1$ (FIG. 2).

The operation of the apparatus thus extended to allow rotation in either direction is as follows, starting from the point where the probe has been lowered into the hole and the X- and Y-counters reset.

The operator begins by turning knob 15 in either direction—clockwise, say—until the radial pin 68 encounters the limit stop peg 67. Further rotation in the same direction drives the peg to the clockwise end of its arc of freedom, and so brings the probe to the point L of FIG. 2, if the peg is not there already. The resulting closure of the associated contacts causes lead 119 to be energized, to open gate 73 (thereby connecting stage 72 to stage 74) and reset any of the bistable stages in network 91. This reset signal, by being applied to stage 98, causes it to apply an alerting signal over lead 99 to gates 92, 94, and 96.

The point L is so located with respect to the X-axis that when the shaft has been rotated to bring the probe to that point, as just described, cell $p$ is irradiated sufficiently more than cell $q$ to allow signal P to switch stage 72 to its Set condition, which is applied to stage 74 through the open gate 73. With stage 74 set, its output lead 75 is energized but the other lead 76 is not. Such energization disposes the reversing stage 77 in the condition to connect the Add and Subtract outputs from stage 48 to the positive and negative inputs of the Y-counter.

Having thus rotated the probe to a starting point, the operator turns knob 15 through a complete rotation in the counterclockwise direction.

The moment the reset contacts break as pin 68 leave peg 67, lead 119 ceases to be energized, thereby closing gate 73 to isolate stage 74 from stage 72 until the contacts become reengaged. Thereafter, for the rest of the scan, stage 74 remains representing the counterclockwise direction of scan by energizing lead 75 rather than lead 76.

As the scan is counterclockwise, gates 94 and 95 are operational. When the point D is passed, therefore, the resulting signal delivered by gate 95 not only resets stages 111 and 115, thereby closing transfer gate 114, but also switches stage 98 to its Set state. The effect of this last operation is to remove the alerting signal from gates 92, 94, and 96 and so render the logical network unresponsive to further switching pulses.

At the end of the scan, pin 68 comes into contact with peg 67 from the other side and drives it to the counterclockwise end of its slot, bringing the probe to the position $L^1$. The resulting closure of the contacts opens gate 73, to restore the control of stage 74 by stage 72, and resets stage 98 and such of the other bistable stages of network 91 as may for some reason be still in their Set state.

The movement of the probe from point L to point $L^1$ necessitates a fifth crossing of an axis—axis A. It is to render the logical network unresponsive to the resulting unwanted fifth switching pulse that stage 98 has removed the alerting signal from gates 92, 94, and 96, as just described, on being switched from gate 95 by the fourth pulse, representing the point D.

The next scan—for example, to check the first reading—will be in the clockwise direction, carrying the probe from the point $L^1$ to L. This time it is signal Q that is the stronger at the start of the scan, causing stages 72 and 74 to take up their reset condition and staticize the direction by energizing lead 76 rather than lead 75. In this direction the grating pulse feed to the Y-counter has to be reversed, and this is effected by stage 77 in response to the new condition of leads 75 and 76. Also in this direction, stage 98 is switched to Set from gate 97 by the fourth switching pulse, now representing the point C.

The details of how subnetworks 71 and 91 respond may be better appreciated from a study of the waveforms of FIGS. 7 and 8 which depict to a somewhat foreshortened angular scale the conditions in response to scans in the counterclockwise and clockwise directions respectively.

In a counterclockwise scan, see FIG. 7, the signals P and Q from cells $p$ and $q$ have the cyclic waveforms ($a$) and ($b$). The angular points marked A, C, B, and D indicate the instants when the light beam is midway between the cells and so defining one of the coordinate axes. The relative phase of signals P and Q is such as to represent the direction of rotation. In this counterclockwise direction wave ($a$) leads on wave ($b$) because on a counterclockwise sweep the reflected light beam reaches cell $p$ slightly before cell $q$ (see FIG. 4). Shortly after leaving point L, point A is passed, and shortly after that the point $L^1$, from which, in this directions of scan, the limit stop is absent. At the end of the scan the limit stop is reengaged at the point L and carried past the point A (the fifth crossing) to the point $L^1$ at the other end of its arcuate slot. Each scan thus results in each signal having five pulses $P^1$ and $Q^1$ respectively, one for each of the four sides of the optical block 61 with the side representing the point A repeated as the unwanted pulse.

The corresponding outputs from bistable stage 72 are shown at ($c$) and ($d$). As at the point L the signal P (wave ($a$)) has the higher amplitude, stage 72 is here switched by it to Set, as already mentioned. The stage is subsequently reset when its inputs equalize at the crossover point of waves (*a*) and (*b*); this occurs at the point A where the beam is midway between cells *p* and *q*. After that, the stage is set by the leading edge of each pulse P¹ and reset at the ensuing crossover. Owing to the sloping edges of pulses P¹, the corresponding edges of waves (*c*) and (*d*) are ill defined, whereas their ensuing edges, occurring at the points of crossover, are well defined.

If there should be some unbalance in the electrical characteristics of the cells or in the ambient illumination, stage 72 may become set somewhere between the end of a pulse Q¹ and before the start of the next pulse P¹. This however would not affect the operation, since it is only the other edges of these pulses, accurately defined by the crossovers of those pulses, that are made use of.

The outputs from stage 74 duplicate those of stage 72 at the start of the scan and remain in that condition for the rest of it because gate 73 isolates stage 74 from the subsequent reversals of stage 72—see waves (*e*) and (*f*).

The responses of differentiator stages 81 and 82 to the outputs from stage 72 are shown at (*g*) and (*h*). As the connection to stage 81 is from that output of stage 72 which goes positively on resetting, wave (*g*) has a well-defined positive-going pulse V coincident with each crossover point of waves (*a*) and (*b*), and an ill-defined negative-going pulse W approximately coincident with each ill-defined leading edge of wave (*a*). Wave (*h*) has corresponding pulses V and W coincident with but of opposite senses to those of wave (*g*).

It is to extract the well-defined pulses V for use as the switching pulses (to control the application of the grating pulses to the counter) and delete the ill-defined pulses W that the direction signals on leads 75 and 76 are used to gate the outputs from stages 81 and 82 into leads 85 and 86. The combination at the input to gate 82 of waves (*e*) and (*g*) passes the pulses V of wave (*g*) into lead 85—see wave (*i*)—whereas wave (*f*) prevents any pulses from reaching lead 86 (wave (*j*)).

Waves (*k*) and (*l*) show the response of cells *r* and *s*, which, when illuminated, are fully so when the beam is midway between cells *p* and *q*.

Wave (*m*) shows the particular pulse VA passed by gate 92 at the point A (represented by the code condition R and S). The pulse sets stage 102, which in turn sets stage 103—provided that no grating pulse is present to block gate 104. By being switches to its Set state, stage 103 opens the transmission gate 107 and so initiates the X-count.

If a grating pulse were present, it would merely delay the switching of stage 103 until that grating pulse had ended, thereby preventing the above-mentioned possibility of misoperation due to the initiation of the X-count in the middle of a grating pulse.

The subsequent pulse VB at the point B (NR and S) operates to reset stage 102 and with it stage 103 (with a slight delay, if a grating pulse is blocking gate 105) to close gate 107 and so arrest the count.

Similarly, wave (*n*) shows the pulses VC and VD which define the Y-count between the points C (R and NS) and D (NR and NS). Each pulse VC operates similarly to pulses VA by setting stages 111 and 115 to open gate 114 and so initiate the Y-count, and the subsequent pulse VD arrests the count by resetting those stages and so closing gate 114—in each case with a slight delay if gate 116 or 117 is blocked by a grating pulse.

When the point L is reached near the end of the scan, the reclosing of the contacts between pin 68 and the limit stop generates the reset signal for application over lead 119. As by this point the four bistable stages in subnetwork 91 should already be in their reset condition, the main effects of the signal are to reopen gate 73 (so as to allow stage 74 to take up the next condition of stage 72) and reset stage 98.

The conditions on a clockwise scan may readily be ascertained by viewing the waveforms of FIG. 7 from right to left, starting from the point L¹. The curves have however been redrawn in FIG. 8 to read from left to right. In this direction of rotation, represented again by the relative phase of the cyclic signals P and Q, with this time Q leading P, the four axis points are reached in the order A, D, B, C, rather than A, C, B, D as in FIG. 7. Further, stage 72 is set at each crossover point and reset by the ill-defined trailing edge of the next pulse P¹ or the ill-defined leading edge of pulse Q¹. With lead 76 energized, it is gate 84 that is alerted this time, to pass the sharp positive-going pulses of wave (*h*) as shown in wave (*j*). Though wave (*n*) looks the same as in FIG. 7, its pulses V now occur in the order D, C, rather than C, D, as in FIG. 7, and are passed by gates 96 and 97 instead of gates 94 and 95. Thus each Y-count is now initiated by a pulse VD and arrested by a pulse VC.

If it is desired to indicate the quadrant occupied by the hole axis, the auxiliary equipment shown in FIG. 9 may be added. It consists of a quadrant indicator 121 divided into four boxes representing the respective quadrants. The front of each box takes the form of a translucent panel bearing some sort of indication to identify the particular quadrant represented and arranged to be illuminated by a lamp (not shown) located behind it. The lamp in the box intended to indicate quadrant I (see FIG. 2) is included in the output circuit of a two-entry AND-gate 122. To this are applied as inputs a connection from the X-counter 51 which is energized when the counter's contents are negative and one from the Y-counter which is energized when its contents are positive. Similar arrangements are made to control the other lamps by way of gates 123 to 125.

Where it is desired to use for the X- and Y-counters a simple counter of the kind which receives pulses over Add and Subtract input rails and on passing through zero in the Subtract direction displays complementary values, e.g., 999, 998, etc., with no display of sign, the circuit of FIG. 10 may be used to enable the counter to provide the information which the invention is required to supply. The X-counter 51 is taken as an example.

The Add and Subtract leads 131 and 132 from stage 48, by way of the transmission gate 107 (FIG. 6), are applied by way of two-entry AND-gates 133 and 134 to the Add and Subtract rails 135 and 136 of the actual counter 127. Leads 131 and 132 are also cross-connected by way of two further AND-gates 141 and 142 to rails 136 and 135 respectively.

The second input to each of gates 133 and 134 is provided from the Set output of a bistable stage 143, the Reset output of which supplies the second inputs to gates 141 and 142. The stage energizes one or other of output leads 145 or 146 depending on whether it is in its Set or Reset state.

Leads 131 and 132 are connected to the Set and Reset inputs of stage 143 by way of two-entry AND-gates 147 and 148. To provide the second inputs to those gates, counter 137 has associated with it a simple logical network 151 arranged to supply to both those inputs by way of a lead 152 an alerting signal only when the counter holds zero. Network 152 may take the form of a multiple-entry NAND gate (not shown) with an input connection from each digit stage so that an output is provided only when every stage holds digit 0.

In operation, if with the counter at zero, and hence gates 147 and 148 alerted, the next pulse is an Add pulse received over lead 131, gate 147 is thereby opened and stage 143 switched to its Set condition if not already in it. With lead 145 thus energized, gates 133 and 134 are alerted so that leads 131 and 132 are effectively connected to the Add and Subtract rails 135 and 136 respectively. So long as the counter does not return to zero, subsequent pulses received over lead 131 are added to the count and those received over lead 132 are subtracted, whilst the energized lead 145 causes the positive sign to be exhibited in supplementary stage 51¹.

If on the other hand the next pulse which arrives when the counter holds zero is a subtract pulse, received over lead 132, it is gate 148 that is rendered conductive, to switch stage 143 to its Reset state and energize output lead 146 instead of lead 145. With gates 141 and 142 now alerted, leads 131 and 132 are effectively cross-connected to rails 136 and 135, so that each Add pulse arriving over lead 131 is passed to the Subtract input rail 136. Thus Subtract pulses are added, and Add pulses are subtracted, whilst lead 146 causes stage 51¹ to display the negative sign.

Similar arrangements may be made for counting the Y-pulses. Where a quadrant indicator 121 (FIG. 9) is provided, its array of gates 122 to 125 are controlled by leads 145 and 146 and the corresponding leads supplied for the Y-counter.

By suitably modifying the logical control of the pulse applications to the X- and Y-counters other quadrants could be used for starting or ending the scans. Thus by extending the arcuate slot of the limit stop to bring the point L¹ into quadrant III, thereby avoiding the need for correcting the Y-count on a clockwise scan, the network of FIG. 6 could be simplified by the omission of gates 96 and 97 and the reversing stage 77. Such an arrangement would however possess the disadvantage of requiring from the operator an additional quarter turn for each scan. Otherwise it would be quite immaterial to the operation and accuracy of the machine which quadrants were used for the limits, and there would be no advantage in adopting an arrangement different from that described with reference to FIG. 6.

Various other details of the equipment may be modified within the scope of the invention. Where for example the reset contacts at the limit stop operate with sufficient precision to maintain the reset condition as the fifth axis is crossed, stage 98 and the fourth inputs from it to gates 92, 94, and 96 may be omitted. When on the other hand stage 98 is provided, the reset contacts may be omitted and the resetting effected by hand—by, say, a pushbutton switch which when activated by the operator preparatory to a scan causes the energization of lead 119.

Instead of peg 67 (FIG. 5) being movable in arcuate slot 67¹, it may be fixed, and the necessary range of freedom between points L and L¹ attained by making pin 68 movable between two stops fixed to shaft 11.

In describing the apparatus of FIG. 1, it was assumed that the gratings 31 and 32 were of a standard pitch and so providing a pulse for each predetermined increment of distance moved. By using gratings of double that pitch, therefore, halver stage 46 may be dispensed with.

It is not essential to use an optical grating system for the linear-movement transducer; any other convenient arrangement for deriving pulses in response to a straight-line movement may alternatively be employed.

The invention is also applicable where both the carriage and the gantry are fixed and the movements in the X- and Y-directions are effected by moving the workpiece.

Where it is desired to use the machine for checking the axial center of a cylindrical stub, the only modification necessary is to reverse the tensions of the springs 24 and 26 so that their combined result is to urge the probe radially inwards, towards axis 12. When brought into engagement with the cylindrical surface of the stub, therefore, the springs maintain the probe tip in contact with that surface during a circular scan. As it is now the opposite face of the probe tip 23 from face 23¹ that constitutes the actual gauging surface, a corresponding shift of datum must be allowed for. The operation of the machine is otherwise as described.

The machine may also be used for measuring linear dimensions of a workpiece, by bringing the probe tip successively into engagement with the workpiece surfaces whose distance apart is to be determined and noting the difference between the counter readings.

What we claim is:

1. A probe structure for a coordinate inspection machine, the structure including
   a. a shaft rotatable about its own axis and carrying a radial arm,
   b. a probe extending generally parallel to that axis from a supporting carriage which is arranged to traverse the arm from a datum position of the probe,
   c. linear transducer means for measuring by a pulse count the extent and sense of the probe movement along the arm with respect to the datum position,
   d. control means for defining a system of rectangular X- and Y-coordinates in a plane normal to said axis with the axis as origin and for deriving with respect to that system
      (i) axis-engagement signals accurately responsive each time the probe comes into engagement with a said coordinate axis during a rotation of the shaft, and
      (ii) axis-identifying signals for severally representing the identity and sign of each coordinate axis thus engaged by the probe,
   e. bidirectional counters allocated to the X- and to the Y-coordinate axes of said system, and
   f. a logical network, controllable by said signals (i) and (ii) as the probe traces out a circle whilst the shaft rotates, for applying the transducer pulses to the X- and to the Y-counters throughout arcs of said circle having as the chords the X- and the Y-coordinate axes respectively,
   whereby at the conclusion of a complete rotation of the shaft the counters define by the number and sign of their contents the respective coordinates of the center of said circle with respect to said coordinate system.

2. Apparatus as claimed in claim 1 wherein the control means includes first rotational transducer means for deriving the axis-engagement signals in the form of two cyclic signals arranged to define the direction of rotation by their relative phase.

3. Apparatus as claimed in claim 2 wherein said first rotational transducer means includes an optical mirror block which is secured to said shaft and is of accurately square section in planes normal to the shaft axis, together with a light source located so that rotation of the block causes a beam of light reflected by the block to sweep through a plane normal to the shaft axis, and two photoelectric devices spaced close to one another along an arc swept by the beam, said cyclic signals being those derived by said devices respectively.

4. Apparatus as claimed in claim 2 wherein said logical network includes a direction-responsive subnetwork arranged to be actuated by those cyclic signals so as to represent the direction of rotation of said shaft during operation.

5. Apparatus as claimed in claim 2 wherein the control means also includes second rotational transducer means for deriving the axis-identifying signals in the form of two signals arranged to identify the coordinate axes by a two-bit binary code.

6. Apparatus as claimed in claim 5 wherein said second rotational transducer means includes an optical mirror block which is secured to said shaft and is of accurately square section in planes normal to said shaft, the edges of the block in those planes being bevelled, together with a light source and two further photoresponsive devices spaced from one another on a plane containing the axis of said shaft, the positions of the source and those devices being such that rotation of the block causes a beam of light reflected by the bevelled edges to be directed towards or away from the last-mentioned devices in accordance with said binary code as the block rotates, said axis-identifying signals being those derived by said further devices respectively.

7. Apparatus as claimed in claim 6 wherein said logical network also includes a switching subnetwork containing a logical array of gates, and connections for applying the axis-engagement signals and the axis-identifying signals to the gates so that the grating pulses are applied to the X- and Y-counters as aforesaid.

* * * * *

PO-1050
(5/69)

UNITED STATES PATENT OFFICE
CERTIFICATE OF CORRECTION

Patent No. 3,639,766  Dated February 1, 1972

Inventor(s) Harry Ogden et al.

It is certified that error appears in the above-identified patent and that said Letters Patent are hereby corrected as shown below:

Cover page, after item [21] insert:
--[30] Foreign Application Priority Data
      Dec. 9, 1967      Great Britain .... 56,073/69--.
Column 2, line 40, "worpiece" should be --workpiece--.

Signed and sealed this 8th day of August 1972.

(SEAL)
Attest:

EDWARD M. FLETCHER, JR.      ROBERT GOTTSCHALK
Attesting Officer             Commissioner of Patents